US008270295B2

United States Patent
Kendall et al.

(10) Patent No.: US 8,270,295 B2
(45) Date of Patent: Sep. 18, 2012

(54) REASSIGNING VIRTUAL LANE BUFFER ALLOCATION DURING INITIALIZATION TO MAXIMIZE IO PERFORMANCE

(75) Inventors: Kris M. Kendall, Hager City, WI (US); Calvin C. Paynton, Byron, MN (US); Michael A. Perez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 11/751,116

(22) Filed: May 21, 2007

(65) Prior Publication Data

US 2008/0291824 A1    Nov. 27, 2008

(51) Int. Cl.
*G01R 31/08* (2006.01)
*G06F 11/00* (2006.01)
*H04J 1/16* (2006.01)

(52) U.S. Cl. ........................................... 370/230

(58) Field of Classification Search ................ 370/296, 370/230, 235, 412, 404, 468, 229
See application file for complete search history.

(56) References Cited

U.S. PATENT DOCUMENTS

| 6,715,055 | B1 | 3/2004 | Hughes |
| 7,150,021 | B1 | 12/2006 | Vajjahala et al. |
| 7,356,648 | B2 * | 4/2008 | Shearer ............... 711/129 |
| 2002/0118646 | A1 * | 8/2002 | Saint Etienne ........... 370/235 |
| 2004/0064664 | A1 | 4/2004 | Gil |
| 2005/0060445 | A1 * | 3/2005 | Beukema et al. ........... 710/52 |
| 2005/0076166 | A1 | 4/2005 | Shearer |
| 2005/0174942 | A1 * | 8/2005 | Betker ................. 370/235 |
| 2007/0081315 | A1 | 4/2007 | Mondor et al. |

FOREIGN PATENT DOCUMENTS

| CN | 1960527 A | 5/2007 |
| JP | 02-039343 | 8/1990 |
| JP | 7084839 A | 3/1995 |
| JP | 2006-195871 | 7/2006 |

OTHER PUBLICATIONS

U.S. Appl. No. 11/751,119, filed May 21, 2007, Office Action dated Jun. 4, 2009, Response dated Sep. 4, 2009, Final Office Action dated Dec. 28, 2009.
JNI Corporation, An Introduction to InfiniBand, Bringing I/O up to speed, Rev. No. v1.1, Date: Jan. 25, 2002.
Mellanox Technologies, InfiniBand™ Frequently Asked Questions, Document No. 2078GI, Rev. 1.10, undated.

(Continued)

*Primary Examiner* — Derrick Ferris
*Assistant Examiner* — Maharishi Khirodhar
(74) *Attorney, Agent, or Firm* — Hamilton & Terrile, LLP; Stephen A. Terrile (57) ABSTRACT

A system and method for reassigning buffer space during to maximize IO performance of virtual lanes is set forth. More specifically, the system and method for reassigning buffer space takes buffer space from unused virtual lanes and reassigns the unused buffer space to used virtual lanes. For example, in an embodiment that supports four virtual lanes where only two virtual lanes are in use, the system and method reassign the buffer space from the other two unused virtual lanes for use by the two virtual lanes in use.

9 Claims, 7 Drawing Sheets

OTHER PUBLICATIONS

"An efficient implementation of the InfiniBand link layer," Jaesung Lee; Hyuk-Jae Lee; Kyoung Park, SOC Conference, 2003. Proceedings. IEEE International [Systems-on-Chip] Sep. 17-20, 2003, pp. 355-358.

"Analyzing the influence of virtual lanes on the performance of infiniband networks," Sancho, J.C.; Flich, J.; Robles, A.; Lopez, P.; Duato, J.; Source: Parallel and Distributed Processing Symposium., Proceedings International, IPDPS 2002, Abstracts and CD-ROM pp. 166-175, Apr. 15-19, 2002.

"Exploring virtual network selection algorithms in DSM cache coherence protocols," Chaudhuri, M.; Heinrich, M.; Parallel and Distributed Systems, IEEE Transactions on vol. 15, Issue 8, pp. 699-712: Aug. 2004.

J. Lee et al., An efficient implementation of the InfiniBand link layer, SOC Conference, 2003, Proceedings, IEEE International [Systems-on-Chip] Sep. 17-20, 2003, pp. 355-358.

J.C. Sancho, et al., Analyzing the influence of virtual lanes on the performance of infiniband networks, Source: Parallel and Distributed Processing Symposium, Proceedings International, IPDPS 2002, Abstracts and CDROM, pp. 166-175, Apr. 15-19, 2002.

Chaudhuri, M. et al., Exploring virtual network selection algorithms in DSM cache coherence protocols, Parallel and Distributed Systems, IEEE Transactions on vol. 15, Issue 8, pp. 699-712: Aug. 2004.

Pan et al., Translation of Abstract for CN 1960527, published May 9, 2007.

U.S. Appl. No. 11/751,119, filed May 21, 2007.

Agilent Technologies, PCI Express Tools, From the Physical Layer to a Fully Operating System, Oct. 2, 2006.

W.J. Dally, Virtual-Channel Flow Control, IEEE Transactions on Parallel and Distributed Systems, vol. 3, No. 2, Mar. 1992.

JNI Corporation, An Introduction to InfiniBand, Bringing I/O up to speed, Rev. Number: v1.1, Date: Jan. 25, 2002.

Mellanox Technologies, InfiniBand™ Frequently Asked Questions, Document No. 2078GI, Rev. 1.10, Jun. 7, 2002.

H. Yi et al., An Efficient Buffer Allocation Technique for Virtual Lanes in InfiniBand Networks, Date: 2003, Source: Book Series: Lecture Notes in Computer Science; Book: Web and Communication Technologies and Internet-Related Social Issues—HSI 2003; pp. 272-281, Date: 2003.

F. Alfarol et al., Tuning Buffer Size in InfiniBand to Guarantee QoS, Source: Book Series: Lecture Notes in Computer Science; Book Euro-Par 2004 Parallel Processing, pp. 873-881, Date: 2004.

Mellanox Technologies, InfiniBand™ Frequently Asked Questions, Document No. 2078GI, Rev. 1.10, Nov. 2, 2000.

* cited by examiner

REASSIGNING VIRTUAL LANE BUFFER ALLOCATION DURING INITIALIZATION TO MAXIMIZE IO PERFORMANCE

CROSS REFERENCE TO RELATED APPLICATION

The present application contains subject matter that may be related to the subject matter in the following U.S. application filed on even date herewith and assigned to the assignee of the present application: Dynamically Reassigning Virtual Lane Resources Ser. No. 11/751,119.

BACKGROUND OF THE INVENTION

1. Field of the Invention

The present invention relates in general to the field of computers and similar technologies, and in particular to computer input output (IO) performance. Still more particularly, the present invention relates to reassigning buffer allocation to maximize IO performance of virtual lanes.

2. Description of the Related Art

Given the continually increased reliance on computers in contemporary society, computer technology has had to advance on many fronts to keep up with increased performance demands. To meet increased performance demands, it is often desirable to provide increasingly faster and more complex hardware components. Furthermore, in many applications, multiple hardware components, such as processors and peripheral components such as storage devices, network connections, etc., are operated in parallel to increase overall system performance.

One particular area to which development efforts have been directed is that of managing hardware components utilized by a computer, e.g., storage devices, network connections, workstations, and the adapters, controllers and other interconnection hardware devices utilized to connect such components to the central processing units (i.e, the processors) of the computer. Peripheral components, which are often referred to as input/output (IO) resources, are typically coupled to a computer via one or more intermediate interconnection hardware devices components that form a "fabric" through which communications between the central processing units and the IO resources pass.

In higher performance computer designs, the IO performance may necessitate a complex configuration of interconnection hardware devices to handle the communications needs of the designs. In some instances, the communications needs may be great enough to necessitate additional enclosures that are separate from, and coupled to, the enclosure within which the central processing units of a computer are housed.

Often, in more complex designs, peripheral components such as IO adapters may be coupled to an IO fabric using slots that are arrayed in either or both of a main enclosure or an auxiliary enclosure of a computer. Other components may be mounted or coupled to an IO fabric in other manners, e.g., via cables and other types of connectors; however, these other types of connections are also referred to as slots. Regardless of the type of connection used, an IO slot therefore represents a connection point, or IO endpoint, for an IO resource to communicate with a computer via an IO fabric.

In higher performance computer designs, the number of IO slots available in a system can scale up into the hundreds. When dealing with a large number of IO slots, the IO can be separated from the CPU Complex using IO drawers. To connect the IO drawers to the CPU complex, the IO function is divided into two components, Hubs and Bridges. Hubs refer to the portion of the IO function that is directly connected to the processor complex (also referred to as a processor node). Bridges refer to the components in the IO Drawers that connect with the Hubs.

Depending on the IO Drawer design, there can be one or multiple IO bridges per IO drawer. As systems scale out, the number of IO Hubs also increases along with the number of IO Bridges. When attaching multiple IO bridges to a single hub, the bridges can be strung together and connected to the Hub in a loop or string configuration. The data is passed between the hub and bridges via a bus such as an industry standard bus such as InfiniBand or peripheral component interconnect express (PCI-Express). Buses that conform to the InfiniBand or PCI-Express protocols use a concept referred to as virtual lanes to pass data between the various components. Each virtual lane has a set amount of buffer space assigned to it for passing data in both directions. One issue relating to virtual lanes is that due to cost and space limitations, the amount of buffer space per virtual lane is limited. This limitation can dictate the overall IO performance of the system and individual IO components.

Accordingly, it would be desirable to provide a method for reassigning buffer space during initialization and runtime applications to maximize IO performance of virtual lanes.

SUMMARY OF THE INVENTION

In accordance with the present invention, a method for reassigning buffer space during to maximize IO performance of virtual lanes is set forth. More specifically, the method for reassigning buffer space takes buffer space from unused virtual lanes and reassign the unused buffer space to used virtual lanes. For example, in an embodiment that supports four virtual lanes where only two virtual lanes are in use, the method reassigns the buffer space from the other two unused virtual lanes for use by the two virtual lanes in use.

When reassigning virtual lane buffer space, virtual lane buffer space can be assigned based on the direction in which the data is moving. With virtual lane buffer space, the buffer space is separated into space that is used to pass data and space that is used for receive data. For passing data, only enough space to hand the data off the neighboring component is needed, for receiving data, as much space as possible is desirable to capture both the data that is requested and the data that passed on from another component.

Accordingly, in one aspect of the invention, buffer space is removed from unused virtual lanes and then reassigned based on a direction of data flow. For the virtual lanes that are used for passing data, the buffer space is set to a minimum buffer space size and for virtual lanes that are used for receiving data, the buffer space is set to a maximum buffer space size.

In another aspect of the invention, the configuration of the bridges is also considered when reassigning buffer space. For example, when the bridges are configured in either a loop or string configuration of bridges, the direction in which the data is flowing will vary based on where the bridge is relative to the hub. More specifically, with a loop of bridges, some of the bridges send data in one direction towards the hub and some bridges send data in the other direction. For a string configuration, the data only flows in one direction relative to the hub.

The system for reassigning buffer space determines the various configurations that could occur and configures the system during initialization. Additionally, the system for reassigning buffer space addresses runtime situations where the data direction changes such as due to error conditions or drawer addition or removal or loops broken into strings or strings connected into loops. In those cases, the system for reassigning buffer space reallocates the buffers during runtime to maintain the performance of the system. Additionally, in certain cases, it is desirable for the system to take into account where data is temporarily stopped prior to reallocation.

In certain embodiments, the system for reassigning buffer space is implemented in the firmware of the system. During initialization of the system, the firmware first determines which virtual lanes are not going to be used and reassigns the buffer space to the remaining virtual lanes. Then based on how the bridges are attached to the hubs, the firmware assigns buffer space to maximize IO performance so that virtual lane ports receiving data have the majority of the buffer space versus virtual lanes that passing the data. The firmware then monitors the system for data direction changes. If such a change is detected, then the firmware reassigns the virtual lane buffers to maximize the performance in the other direction after first temporarily stopping data flow.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
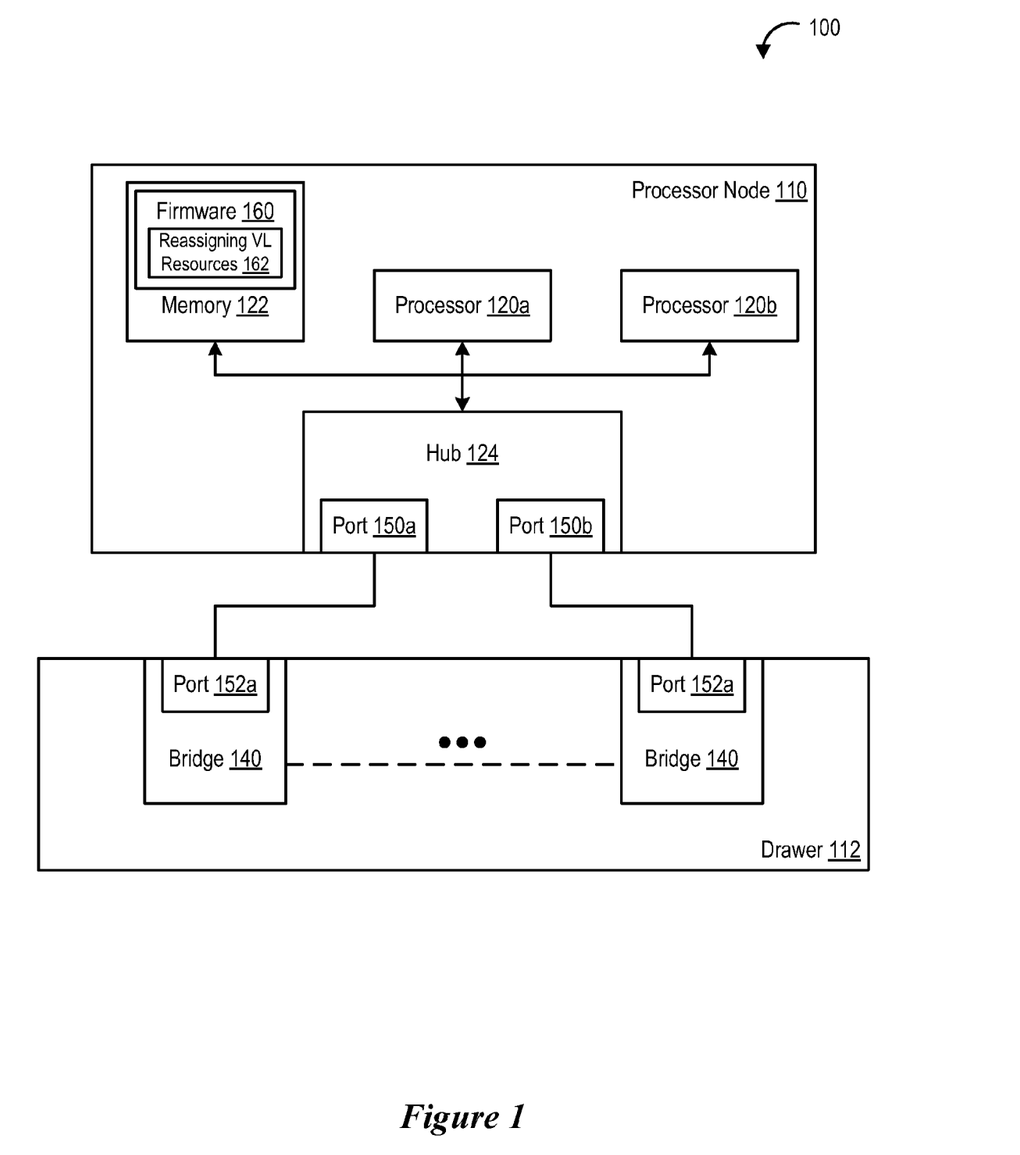
FIG. 1 shows a block diagram of an exemplary computer system in which the present invention may be implemented.

Referring to FIG. 1, a block diagram of an exemplary computer system in which the present invention may be implemented is shown. More specifically, the computer system 100 includes at least one processor node 110 which is coupled to an input output (IO) drawer unit 112 via a link such as an InfiniBand link. The processor node 110 includes a plurality of processors 120a, 120b, which are coupled to a memory 122 as well as to a hub 124. The input output drawer unit 112 includes one or more bridges 140. The combination of a hub 124 and a bridge 140 provides an IO controller (IOC). A drawer unit 112 is a physical package. Typically, but not necessarily, an IO drawer unit resides within a rack.

The hub 124 implements a plurality of architecture ports 150a, 150b. Each of the bridges 140 implement a plurality of architecture ports 152a, 152b. Each port provides a bidirectional interface that couples a device to a link. A link is a bidirectional high speed connection between two ports on two devices.

The memory 122 includes both volatile and non volatile memory. Firmware 160 is stored within the memory 122 and executed by at least one of the processors 120. The firmware 160 includes a system for reassigning virtual lane resources 162.

In certain embodiments, the system 100 can include a plurality of IO drawer units 112 where each IO drawer unit 112 includes multiple slots (e.g., 6 to 20 slots per drawer) as well as one or more (e.g., 1 to 4) bridges per IO drawer unit 112. The IO drawer units 112 can be coupled to each other in either a string or loop configuration. Each of the IO slots may conform to an IO protocol such as the PCIX or PCI Express protocols.

Information is communicated between the hub and the bridges via virtual lanes. Virtual lanes allow for separating data based on class type (e.g., responses/requests) and address quality of service as well as ordering and coherency issues.

There are two primary command types for transferring data between hubs and bridges. The two command types are requests and responses. A request is used when a devices is asking for something such as a DMA Read/Write, a Memory-Mapped Read/Write read, an IO Read/Write, a Configuration Read/Write, messages and interrupts. A responses is used when data is returned from a request such as data returned from a DMA Read Request. Requests and responses are unordered and are treated as independent streams. In order to do that they are assigned different virtual lanes.

Figure 2:
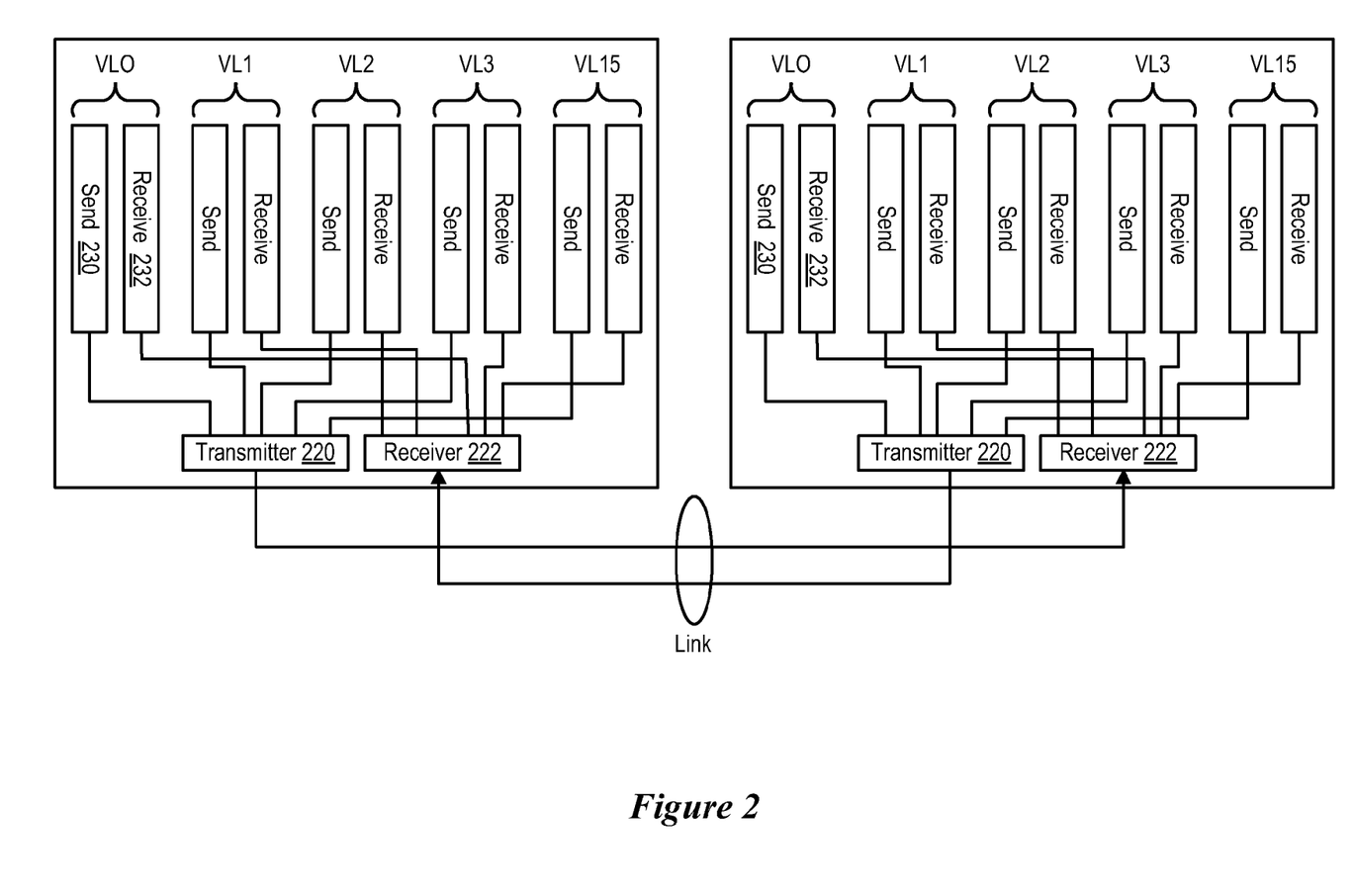
FIG. 2 shows a block diagram of an example of virtual lane data flow.

Referring to FIG. 2, a block diagram of the interconnection of ports and links is shown. More specifically, each port 150, 152 includes a plurality of virtual lanes 210 as well as a transmitter 220 and a receiver 222. Each virtual lane includes a send buffer 230 and a receive buffer 232. Each buffer pair provides a virtual lane buffer resource.

In one embodiment, each port 150, 152 of the hub 124 and bridge 140 implements four pairs of send/receive buffer pairs. Each port implements a plurality of virtual lanes including data virtual lanes (VL0-VL3) which function as data buffers used to send and receive data packets and virtual lane 15 (VL15) which functions as a subnet management packet (SMP) buffer dedicated to the send and receive of SMP packets.

Even though all virtual lanes use the same physical wires (i.e., links) to transport data, each virtual lane is treated as an independent data stream. Because each virtual lane is an independent data stream, each virtual lane includes independent buffer space, arbitration and other items associated with the transportation protocol per virtual lane. Each virtual lane has a set amount of assigned buffer space for passing data in both directions. The buffer space is used to temporarily store data as it crosses between devices. The hub and bridges use flow control to communicate between each other the amount of available buffer space. If the adjacent device does not have enough buffer space to store the data being passed, then the passing device can not forward the data.

Figure 3:
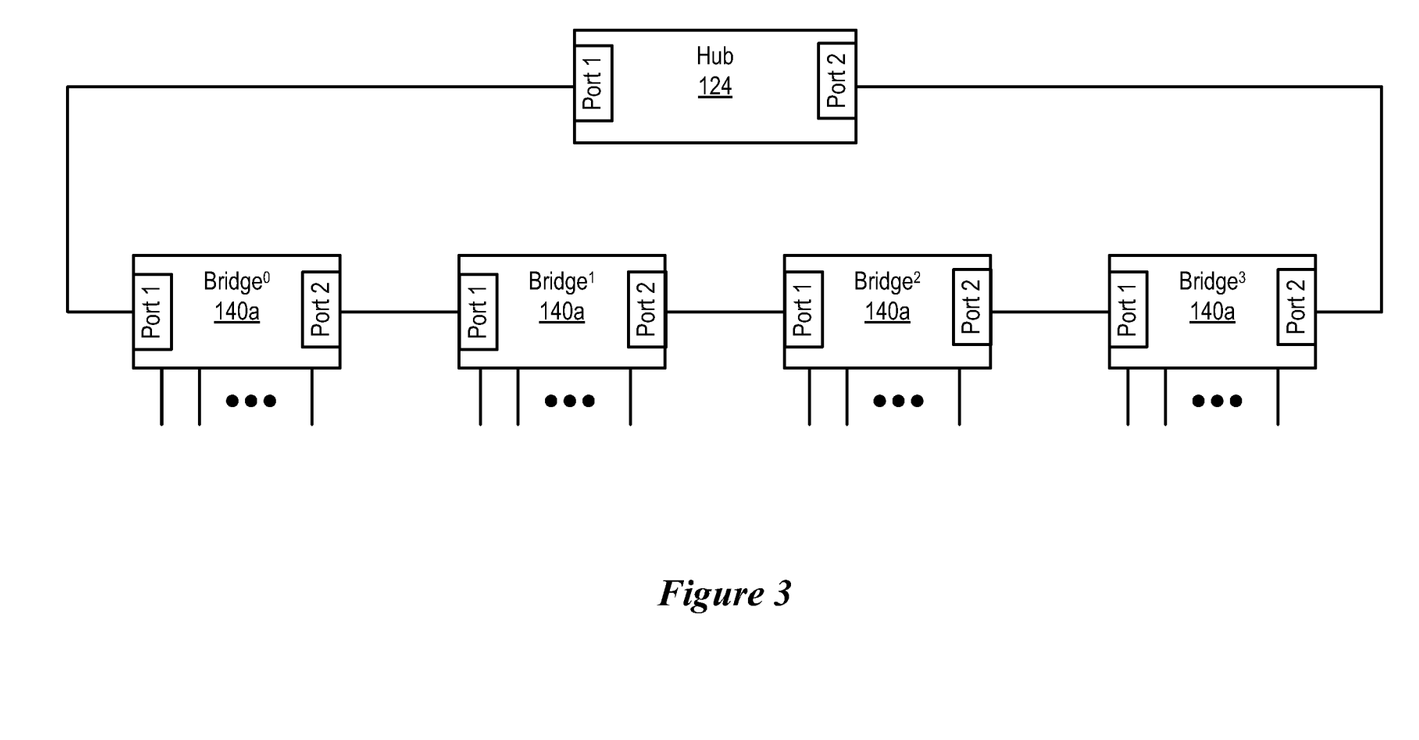
FIG. 3 shows a block diagram of an example of interconnection of a hub and a plurality of bridges in a loop configuration.

FIG. 3 shows a block diagram of an example of interconnection of a hub and a plurality of bridges in a loop configuration. More specifically, in a loop configuration, a first hub port (Port1) is coupled to a first bridge port of a first bridge (Bridge 0, Port1). A second bridge port of the first bridge (Bridge 0, Port 2) is coupled to a first bridge port of a second bridge (Bridge1, Port 1). A second bridge port of the second bridge (Bridge 1, Port 2) is coupled to a first bridge port of a third bridge (Bridge2, Port 1). A second bridge port of the third bridge (Bridge 2, Port 2) is coupled to a first bridge port of a fourth bridge (Bridge 3, Port 1). A second bridge port of the fourth bridge (Bridge 3, Port 2) is coupled to a second port of a hub (Port 2).

Figure 4:
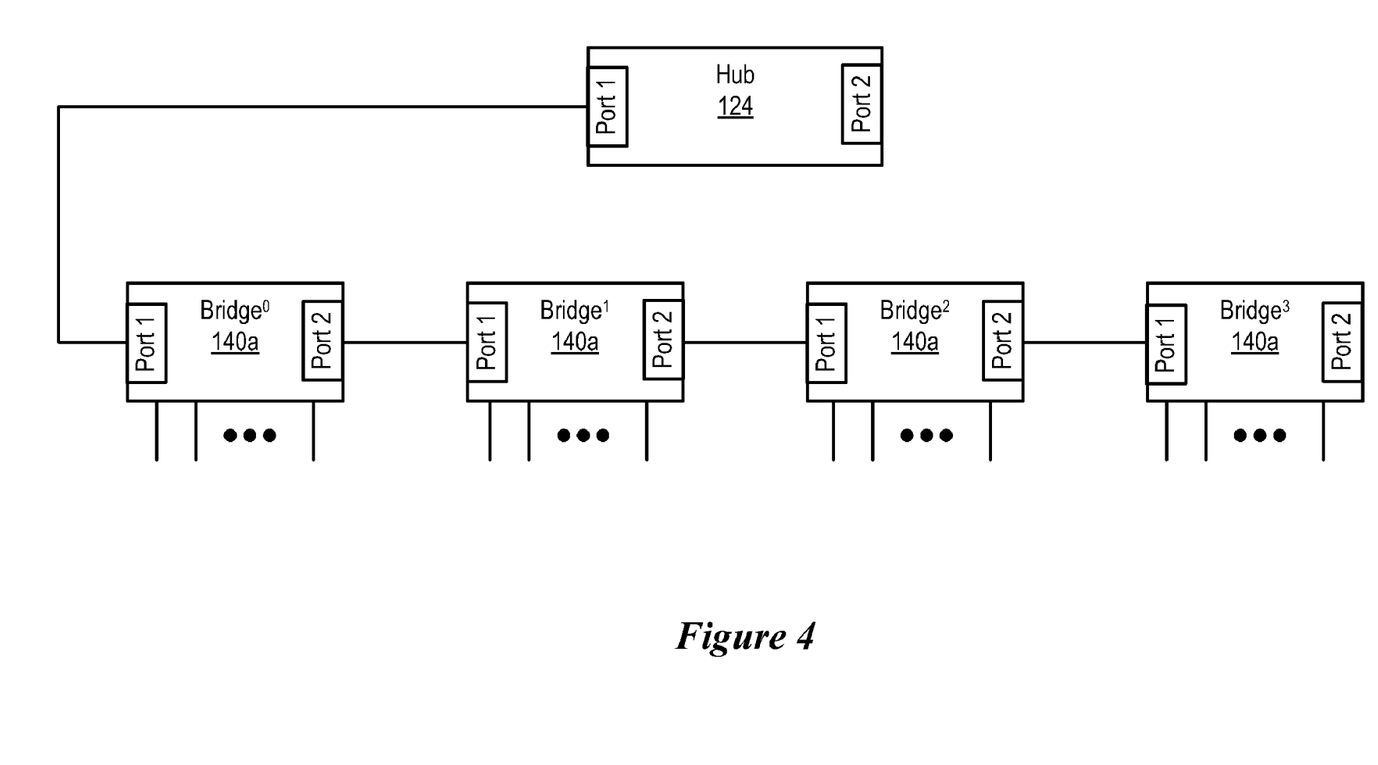
FIG. 4 shows a block diagram of an example of interconnection of a hub and a plurality of bridges in a string configuration.

FIG. 4 shows a block diagram of an example of interconnection of a hub and a plurality of bridges in a string configuration. More specifically, in a string configuration, a first hub port (Port1) is coupled to a first bridge port of a first bridge (Bridge 0, Port1). A second bridge port of the first bridge (Bridge 0, Port 2) is coupled to a first bridge port of a second bridge (Bridge1, Port 1). A second bridge port of the second bridge (Bridge 1, Port 2) is coupled to a first bridge port of a third bridge (Bridge2, Port 1). A second bridge port of the third bridge (Bridge 2, Port 2) is coupled to a first bridge port of a fourth bridge (Bridge 3, Port 1). A second bridge port of the fourth bridge (Bridge 3, Port 2) is unattached. A second port of the hub is also unattached.

Figure 5:
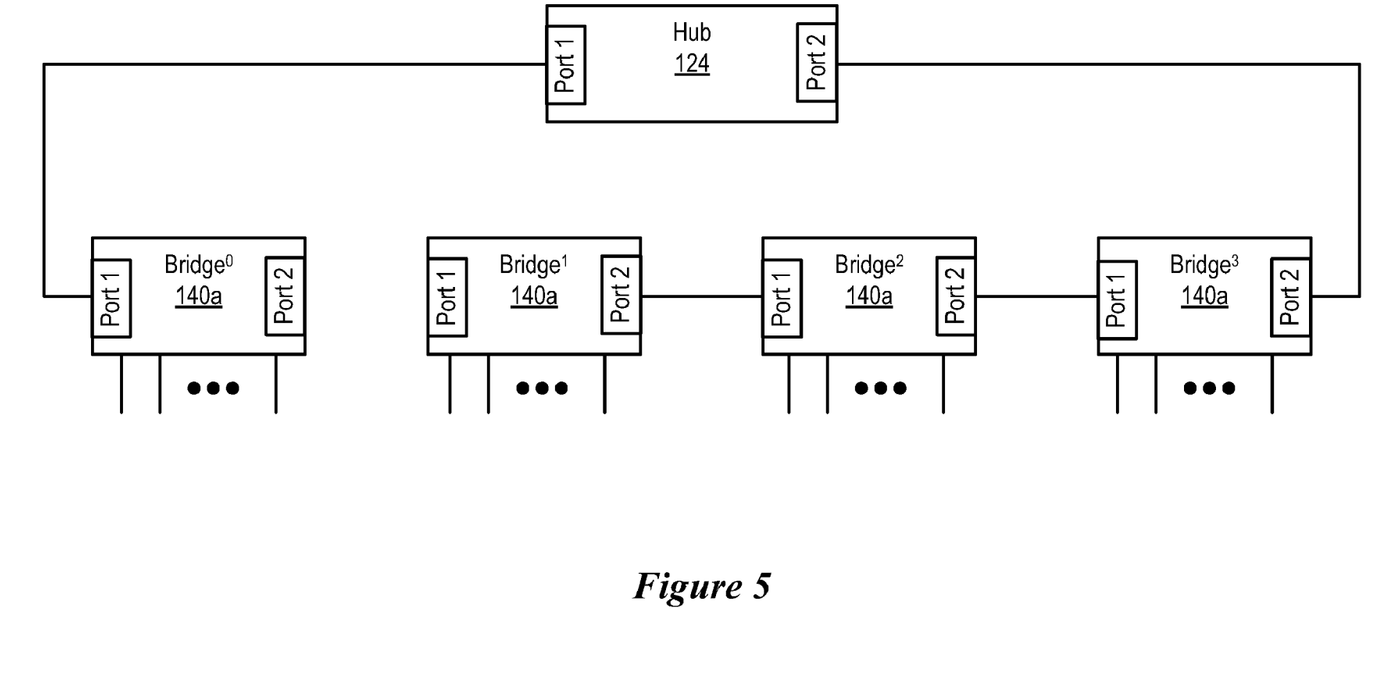
FIG. 5 shows a block diagram of an example of a hub and a plurality of bridges in a multi string configuration.

FIG. 5 shows a block diagram of an example of a hub and a plurality of bridges in a multi string configuration. More specifically, in a multi string configuration, a first hub port (Port1) is coupled to a first bridge port of a first bridge (Bridge 0, Port1). Additionally, a second bridge port of a second bridge (Bridge 1, Port 2) is coupled to a first bridge port of a third bridge (Bridge2, Port 1). A second bridge port of the third bridge (Bridge 2, Port 2) is coupled to a first bridge port of a fourth bridge (Bridge 3, Port 1). A second bridge port of the fourth bridge (Bridge 3, Port 2) is coupled to a second port of a hub (Port 2). The first bridge and second bridge are not connected.

Figure 6:
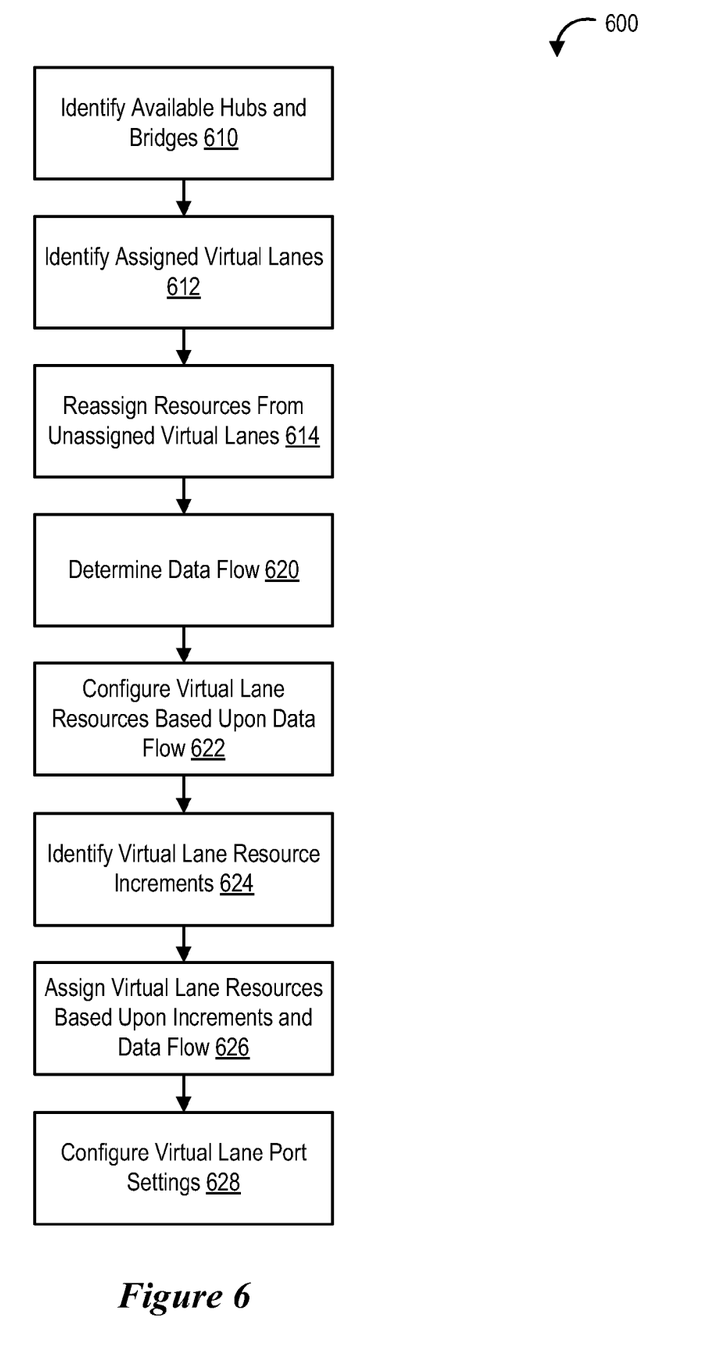
FIG. 6 shows a flow chart of the operation of a system for reassigning virtual lane resources.

Referring to FIG. 6, a flow chart of the operation of a system for reassigning virtual lane resources is shown. More specifically, the system for reassigning virtual lane resources 600 starts operation by identifying available hubs and bridges within the system 100 at step 610. Next, at step 612, the system determines which virtual lanes within the system are not assigned (i.e., are not being used by the system). For example in one implementation, while the IO drawer units have four virtual lanes, only virtual lanes 0 and 1 are assigned. If the system 600 determines that some virtual lanes not being used, then the system 600 reassigns some or all of the buffer space from the unused virtual lanes to the used virtual lanes at step 614. For example, in an embodiment where virtual lanes 2 and 3 are not being used, then the system 600 reassigns the buffer space from virtual lanes 2 and 3 to virtual lanes 0 and 1.

Next, the system 600 determines the data flow within the system 100 at step 620. The data flow may have been assigned by firmware during initialization or may be assigned by firmware at step 620. Certain aspects of the assignment of resources depend on the direction of the data flow. At step 622, the system configures virtual lane resources based upon the data flow.

For a string all data flows in one direction between the hub and any given Bridge. For a string configuration, the firmware assign data flow in one direction. In a loop configuration, any given bridge has two possible data paths to send data to the hub. In one embodiment, for a loop configuration, firmware splits the data flow so that half the bridges send data to hub port1 and half the bridges send data to hub port2. It is possible that firmware could assign bridges differently if firmware took into account which devices are coupled to the slots of a particular bridge and then assigned data flow based on potential bandwidth of devices versus the number of bridges. The system 600 determines a direction of data flow by reading registers in the hub and bridge related to the data flow function.

Next, at step 624, the system identifies virtual lane resource increments and determines how much buffer space to assign for each virtual lane.

For example, in one embodiment, in a system that has 2 Kbytes of available virtual lane buffer resource and a virtual lane granularity of 512 bytes there are a plurality of possible virtual lane buffer assignments. More specifically, the virtual lane buffer assignments include:
VL0=512, VL1=1536,
VL0=1536, VL1=512
VL0=1024, VL1=1024

It will be appreciated that variations on virtual lane buffer size and virtual lane buffer granularity other possible assignments are available.

In a string configuration, one port in the path of the hub is either directly connected to the hub or is coupled to a bridge or bridges that are connected to the HUB. In a loop configuration, one of the ports of the bridge is in the path of port1 of the hub and the other port of the bridge is in the path of port 2 of the hub. Even though every bridge has two paths to the hub in a loop configuration, data only flows on one path.

Also, because the IO drawer unit 112 can include a series of bridges 140 per hub 124, a bridge 140 can also send pass thru data to and from adjacent bridges communicating with the hub 124 without its own data.

Next at step 628, the system configures virtual lane ingress port buffer settings for every bridge based on data flow direction of the bridge 140. More specifically, a bridge port that is sending data to the hub 124 is referred to as an ingress port. A bridge port that is passing data to an adjacent bridge but in the direction away from the hub 124 is referred to as the egress port.

For the ingress port, requests are passed in the direction of the hub 124. These requests were either generated within the bridge internally or the requests were handed as pass thru from the egress port. Because these requests are short term, the buffer requirements are the requests that are passed in the direction of the hub 124 minimal. For the ingress port, responses represent data from previous requests from either internal requests or requests from bridges downstream of the egress port. To maximize performance and minimize the time the adjacent bridge must wait before sending more response data to the ingress port, the response virtual lane resources should be maximized. Accordingly, for the ingress port it is desirable to maximize the virtual lane buffering for responses and minimize the virtual lane buffering for requests.

Using the example of a system having 2 Kbyte of virtual lane buffer resources, for the ingress port virtual lane 0 is configured to handle requests and virtual lane 1 is configured to handle responses. Thus the resources are configured such that the VL0 resources are minimized to 512 Bytes and the VL1 resources are maximized to 1536 Bytes.

For the egress port, requests are received from adjacent bridges. There could one adjacent bridge and multiple adjacent bridges. To avoid becoming a bottleneck, the egress port should be configured to accept as many requests as possible. Thus the virtual lane buffer space for the request handling egress port should be maximized. For the egress port, responses flow from the ingress port to the egress port. Because the responses are passing through on a relatively short term, there is no need for a large amount of buffer space since the performance of the response is determined by the virtual lane buffering of the ingress port of the adjacent bridge to which the egress port is forwarding the data. Accordingly, for the egress port it is desirable to maximize the virtual lane buffering for requests and minimize the virtual lane buffering for responses.

Using the example of a system having 2 Kbyte of virtual lane buffer resources, for the egress port virtual lane 0 is configured to handle requests and virtual lane 1 is configured to handle responses. Thus the resources are configured such that the VL0 resources are maximized to 1536 Bytes and the VL1 resources are minimized to 512 Bytes.

Thus the virtual lane associated with receiving data from an adjacent bridge is maximized and the virtual lane associated with passing data between ports within the bridge is minimized.

For example, referring again to FIG. 3, the firmware sets data flow for the two bridges that are closest to port 1 of the hub 124 so that data flows through port1 of the bridge towards the port1 of the hub and data for the two bridges that are closest to port 2 of the hub (bridge 2 and bridge 3) so that data flows through port2 of the bridges towards the port2 of the hub 124.

Using the example of a system that has 2 Kbyte of virtual lane buffer resources, for bridge 0 and bridge 1, the resources are assigned such that the port 1 virtual lane 0 request resources are minimized (e.g., to 512 Byte) and the port 1 virtual lane 1 response resources are maximized (e.g., to 1536 Byte) while the port 2 virtual lane 0 request resources are maximized (e.g., to 1536 Byte) and the port 2 virtual lane 1 response resources are minimized (e.g., to 1536 Byte). For bridge 2 and bridge 3, the resources are assigned such that the port 1 virtual lane 0 request resources are maximized (e.g., to 1536 Byte) and the port 1 virtual lane 1 response resources are minimized (e.g., to 512 Byte) while the port 2 virtual lane 0 request resources are minimized (e.g., to 512 Byte) and the port 2 virtual lane 1 response resources are maximized (e.g., to 1536 Byte).

Also for example, referring again to FIG. 4, the firmware sets data flow for all four bridges so that data flows through port1 of the bridge towards the port1 of the hub and vice versa.

Using the example of a system that has 2 Kbyte of virtual lane buffer resources, the resources are assigned such that the port 1 virtual lane 0 request resources are minimized (e.g., to 512 Byte) and the port 1 virtual lane 1 response resources are maximized (e.g., to 1536 Byte) while the port 2 virtual lane 0 request resources are maximized (e.g., to 1536 Byte) and the port 2 virtual lane 1 response resources are minimized (e.g., to 1536 Byte).

The reassignment of virtual lane resource can occur during a system initialization process (i.e., at boot up of the system). Such a reassignment is referred to as a static reassignment. Additionally, in certain situations it may be desirable to perform the reassignment operation while the system is executing. Such a reassignment is referred to as a dynamic reassignment.

For example, a dynamic reassignment of virtual lane resources may be desirable when a bridge configuration changes from a loop configuration to a string configuration (such as might happen if one end of the loop becomes disconnected). A dynamic reassignment of virtual lane resources may be desirable when a bridge configuration changes from a loop configuration to a multiple string configuration (such as might happen if two bridges within the loop become disconnected). A dynamic reassignment of virtual lane resources may also be desirable when an additional IO drawer unit is added to the system. A dynamic reassignment of virtual lane resources may also be desirable when an IO drawer unit is removed from the system.

More specifically, for the situation where a bridge configuration changes from a loop configuration to a string configuration, when the virtual lane resources were originally reassigned, the virtual lane resources of certain bridges (e.g., bridges 0 and 1) were configured to send in one direction and the virtual lane resources of other bridges (e.g., bridges 2 and 3) were configured to send data in the other direction. If during runtime, the bridge configuration changes, then the performance of the virtual lane resources would be adversely affected if the virtual lane resources were not reassigned.

The system for reassigning virtual lane resources might be included within a firmware Hypervisor that manages partitions or within firmware elements that are part of a run time abstraction service (RTAS).

There are a plurality of mechanisms via which the firmware might become aware of a change in the bridge configuration. For example, the firmware might become aware of a change in the bridge configuration via an interrupt reporting that an error has occurred. The firmware might become aware of a change in the bridge configuration via a polling mechanism that checks for data flow direction and cable attachments. Additionally, the firmware might become aware of a change in the bridge configuration via a service call for the situation where a customer wants to add or remove a drawer For the error situation, where a direction gets blocked because of a bad cable or some other error condition, if we are in loop mode, the bridges automatically reverse the direction of traffic to the opposite hub port. However, with the direction of traffic being reversed, the virtual lane resource configuration is no longer optimized. Such a lack of optimization can result in over a 75% data loss if the virtual lane buffer allocation is not dynamically reassigned to take into account the new data flow direction.

Figure 7:
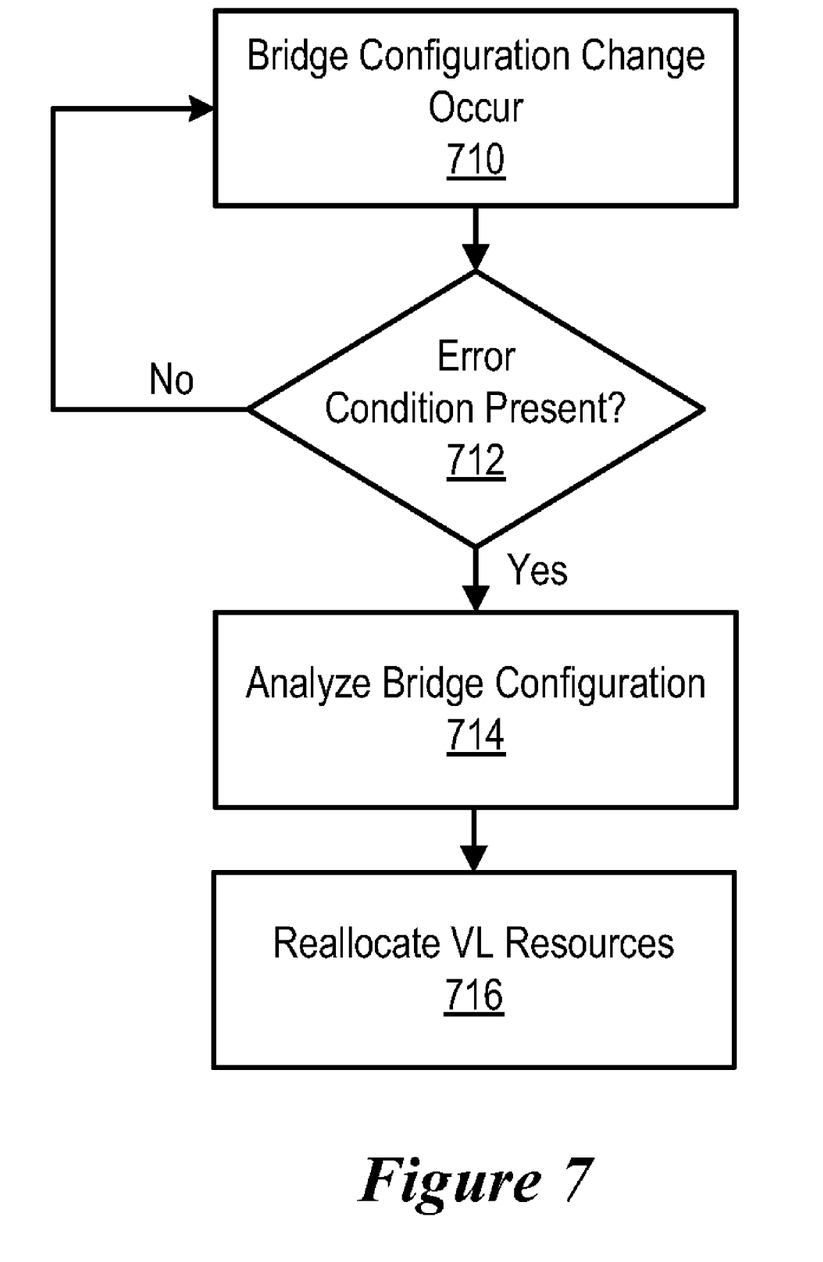
FIG. 7 shows a flow chart of the operation of a system for dynamically reassigning virtual lane resources.

More specifically, referring to FIG. 7, a flow chart of the operation of the operation of a system for dynamically reassigning virtual lane resources is shown. The system starts operation by determining whether a bridge configuration change has occurred at step 710. Such a determination can be made by the system 700 operating in a polling mode of operation to determine whether a bridge configuration change has occurred. Such a change may be detected by receipt of an interrupt or by an indication of a service call. If an interrupt is detected, then the system determines whether an error condition is present at step 712. If an error condition is present, then the system 700 analyzes the bridge configuration to determine whether the direction of the data flow changed at step 714. If direction of the data flow has not changed then does nothing and continues monitoring to determine whether a bridge configuration change has occurred. If the direction of the data flow has changed, then the system 700 begins the process of reallocating the virtual lane resources to optimize those resources for the new bridge configuration at step 716.

More specifically, if the error occurred with an IO drawer unit and the loop configuration has changed (e.g., to a string configuration or a multi string configuration), then the system for dynamically reassigning virtual lane resources reallocates the virtual lane buffer resource assignment.

More specifically, the system for dynamically reassigning virtual lane resources determines where the loop was broken (i.e., at the end or middle of loop). Next the system determines the direction flow for each bridge. If the bridge is located at the end of the string, the direction flow may be the same while if the bridge is located in the middle of the string, the direction flow depends on where the break in the bridge configuration occurred. Next the system temporarily stops all traffic through the bridges. Next, the system reallocates the virtual lane buffering based on the determined data flow for each bridge and then restart traffic flow within the bridges.

For error conditions, the system 700 typically determines that the error occurred via an interrupt from the hardware indicating an error condition. However, the system can also determine that an error occurred via polling of registers within the bridges that are related to data flow direction. If the registers indicate that the data flow direction is different from that understood by the system 700, then the system for dynamically reassigning virtual lane resources will being the process of optimizing the resources for the newly identified data flow.

For a change in a bridge configuration from a string configuration to a loop configuration, it is possible for an interrupt to occur if the bridge is configured to generate such an interrupt. However, typically a change from a string configuration to a loop configuration is identified by polling. The firmware might be checking another set of registers for the presence of a link such as an InfiniBand cable. If the firmware determines that a cable has been reattached or replaced then the firmware can adjust the bridge configuration from a string configuration to a loop configuration. It is important for performance reasons to rebalance the virtual lane resources when a bridge configuration has changes from a string configuration to a loop configuration to allow the system take advantage of both of the ports of the hub for data traffic.

When rebalancing the virtual lane resources, the system for dynamically reassigning virtual lane resources first detect cable attachment. Next, the system configures the port of the hub so that the port is active and available. Next the system temporarily stop traffic flow through the bridges. Next, the system redirect data flow for some of the bridges to rebalance traffic from a string configuration to a bridge configuration. Next the system reallocates virtual lane buffering based on the new data flow for each bridge. Next the system restart traffic flow through the bridges.

When a new IO drawer unit is added, the firmware is notified that a new drawer has joined the configuration. Next, the system for dynamically reassigning virtual lane resources powers the newly added IO drawer unit on and configures the IO drawer unit. Next the system determines the bridge configuration of the bridges within the new IO drawer unit. (I.e., whether the bridges are configured in a loop configuration, a string configuration or a multi string configuration.). Next the system determines the data flow for each bridge within the IO drawer unit. If the bridge is arranged in a loop configuration, then the system determines an ideal data flow if such a data flow has not already been assigned. Next, the system reallocates the virtual lane buffering based on data flow for each bridge and then restart traffic flow within the IO drawer unit.

When an IO drawer unit is removed from the system, the system for dynamically reassigned virtual lane resource functions much the same as when a drawer unit is added with the exception that the system powers off the drawer unit and may prompt a user to reattach cables to complete a remaining bridge configuration.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. For example, while the system for reassigning buffers is described with reference to a firmware implementation, it will be appreciated that the system could be implemented either in software, in hardware or in some combination of hardware and software.

The block diagrams in the Figures illustrate the architecture, functionality, and operation of possible implementations of systems and methods according to various embodiments of the present invention. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for assigning virtual lane resources within a computer system having a hub and a plurality of bridges, the method comprising: identifying available bridges within the computer system, each of the available bridges comprising a plurality of virtual lanes, each of the plurality of virtual lanes comprising respective virtual lane resources, the plurality of virtual lanes comprising assigned virtual lanes and unassigned virtual lanes; and, reassigning virtual lane resources from the unassigned virtual lanes to the assigned virtual lanes, the reassigning being amongst the plurality of bridges; determining a data flow direction for each of the plurality of bridges; and, determining virtual lane resource granularity;

and wherein the reassigning amongst the plurality of bridges takes into account the data flow direction and the virtual lane resource granularity and whether the plurality of bridges are configured in a loop configuration or a string configuration.

2. The method of claim 1 wherein:
each of the plurality of bridges comprises an ingress port and an egress port; and,
the reassigning takes into account a port is an ingress port or an egress port.

3. The method of claim 1 wherein:
the hub and the plurality of bridges are coupled via a link; and,
the link conforms to at least one of an InfiniBand protocol and a peripheral component interconnect express protocol.

4. A system comprising:
a processor;
a hub coupled to the processor;
a plurality of bridges coupled to the processor; and,
a non-transitory computer-usable medium embodying computer program code, the computer program code comprising instructions executable by the processor and configured for: identifying the plurality of bridges, each of the plurality of bridges comprising a plurality of virtual lanes, each of the plurality of virtual lanes comprising respective virtual lane resources, the plurality of virtual lanes comprising assigned virtual lanes and unassigned virtual lanes;
reassigning virtual lane resources from the unassigned virtual lanes to the assigned virtual lanes, the reassigning being amongst the plurality of bridges; determining a data flow direction for each of the plurality of bridges; and, determining virtual lane resource granularity; and wherein the reassigning amongst the plurality of bridges takes into account the data flow direction and the virtual lane resource granularity and whether the plurality of bridges are configured in a loop configuration or a string configuration.

5. The system of claim 4, wherein:
each of the plurality of bridges comprises an ingress port and an egress port; and,
the reassigning takes into account a port is an ingress port or an egress port.

6. The system of claim 4, wherein:
the hub and the plurality of bridges are coupled via a link; and,
the link conforms to at least one of an InfiniBand protocol and a peripheral component interconnect express protocol.

7. A system comprising:
a processor;
a hub coupled to the processor;
a plurality of bridges coupled to the processor; and, a system for reassigning virtual lane resources, the system for reassigning virtual lane resources comprising a module for identifying the plurality of bridges, each of the plurality of bridges comprising a plurality of virtual lanes, each of the plurality of virtual lanes comprising respective virtual lane resources, the plurality of virtual lanes comprising assigned virtual lanes and unassigned virtual lanes; and, a module for reassigning virtual lane resources from the
unassigned virtual lanes to the assigned virtual lanes, the reassigning being amongst the plurality of bridges;
a module for determining a data flow direction for each of the plurality of bridges;
and a module for determining virtual lane resource granularity; and wherein the module for reassigning virtual lane resources amongst the plurality of bridges takes into account the data flow direction and the virtual lane resource granularity and whether the plurality of bridges are configured in a loop configuration or a string configuration.

8. The system of claim 7, wherein:
each of the plurality of bridges comprises an ingress port and an egress port; and,
the module for reassigning takes into account a port is an ingress port or an egress port.

9. The system of claim 7, wherein:
the hub and the plurality of bridges are coupled via a link; and,
the link conforms to at least one of an InfiniBand protocol and a peripheral component interconnect express protocol.

* * * * *